US007318030B2

(12) United States Patent
Guduru

(10) Patent No.: US 7,318,030 B2
(45) Date of Patent: Jan. 8, 2008

(54) METHOD AND APPARATUS TO PERFORM VOICE ACTIVITY DETECTION

(75) Inventor: Vijayakrishna Prasad Guduru, Morris Plains, NJ (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 10/665,859

(22) Filed: Sep. 17, 2003

(65) Prior Publication Data

US 2005/0060149 A1 Mar. 17, 2005

(51) Int. Cl.
*G10L 15/00* (2006.01)

(52) U.S. Cl. ...................................... 704/243; 704/243

(58) Field of Classification Search ................ 704/233, 704/243, 276
See application file for complete search history.

(56) References Cited

U.S. PATENT DOCUMENTS

| | | | | |
|---|---|---|---|---|
| 5,450,484 | A * | 9/1995 | Hamilton | 379/351 |
| 6,321,194 | B1 * | 11/2001 | Berestesky | 704/232 |
| 6,990,194 | B2 * | 1/2006 | Mikesell et al. | 379/406.04 |
| 7,031,916 | B2 * | 4/2006 | Li et al. | 704/233 |
| 2002/0087320 | A1 * | 7/2002 | Lee et al. | 704/270 |

OTHER PUBLICATIONS

A.Cavallaro et al. "A Fuzzy Logic-Based Speech Detection Algorithm for Communications in Noisy Environment" IEEE 19998 pp. 565-568.*

* cited by examiner

*Primary Examiner*—Daniel Abebe
(74) *Attorney, Agent, or Firm*—Kacvinsky LLC

(57) ABSTRACT

A method and apparatus to perform voice detection are described.

19 Claims, 5 Drawing Sheets

100

METHOD AND APPARATUS TO PERFORM VOICE ACTIVITY DETECTION

BACKGROUND

Voice Activity Detectors (VAD) may be used to detect voice or speech in a stream of information. A VAD may be used as part of, for example, an Automated Speech Recognition (ASR) system. The accuracy of the VAD may affect the performance of the ASR system. Consequently, there may be need for improvements in such techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
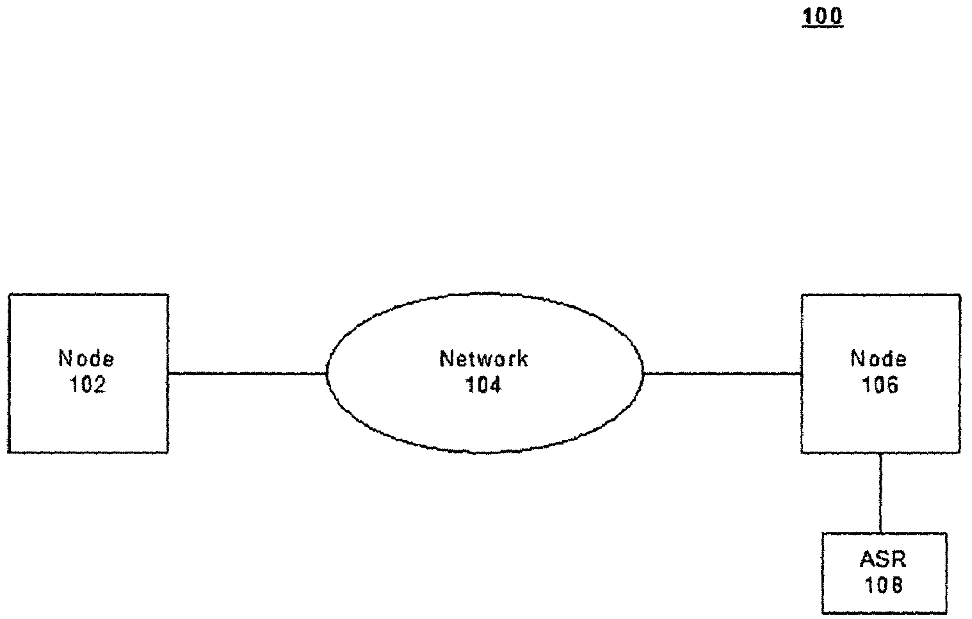
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 may comprise a plurality of network nodes. The term "network node" as used herein may refer to any node capable of communicating information in accordance with one or more protocols. Examples of network nodes may include a computer, server, switch, router, bridge, gateway, personal digital assistant, mobile device, call terminal and so forth. The term "protocol" as used herein may refer to a set of instructions to control how the information is communicated over the communications medium.

In one embodiment, system 100 may communicate various types of information between the various network nodes. For example, one type of information may comprise "voice information." Voice information may refer to any data from a voice conversation, such as speech or speech utterances. In another example, one type of information may comprise "silence information." Silence information may comprise data that represents the absence of noise, such as pauses between speech or speech utterances. In another example, one type of information may comprise "unvoiced information." Unvoiced information may comprise data other than voice information or silence information, such as background noise, comfort noise, tones, music and so forth. In another example, one type of information may comprise "transient information." Transient information may comprise data representing noise caused by the communication channel, such as energy spikes. The transient information may be heard as a "click" or some other extraneous noise to a human listener.

In one embodiment, one or more communications mediums may connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

In one embodiment, the network nodes may communicate information to each other in the form of packets. A packet in this context may refer to a set of information of a limited length, with the length typically represented in terms of bits or bytes. An example of a packet length might be 1000 bytes. The packets may be further reduced to frames. A frame may represent a subset of information from a packet. The length of a frame may vary according to a given application.

In one embodiment, the packets may be communicated in accordance with one or more packet protocols. For example, in one embodiment the packet protocols may include one or more Internet protocols, such as the Transmission Control Protocol (TCP) and Internet Protocol (IP). The embodiments are not limited in this context.

In one embodiment, system 100 may operate in accordance with one or more protocols to communicate packets representing multimedia information. Multimedia information may include, for example, voice information, silence information or unvoiced information. In one embodiment, for example, system 100 may operate in accordance with a Voice Over Packet (VOP) protocol, such as the H.323 protocol, Session Initiation Protocol (SIP), Session Description Protocol (SDP), Megaco protocol, and so forth. The embodiments are not limited in this context.

Referring again to FIG. 1, system 100 may comprise a network node 102 connected to a network node 106 via a network 104. Although FIG. 1 shows a limited number of network nodes, it can be appreciated that any number of network nodes may be used in system 100.

In one embodiment, system 100 may comprise network nodes 102 and 106. Network nodes 102 and 106 may comprise, for example, call terminals. A call terminal may comprise any device capable of communicating multimedia information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals received from another call terminal. The embodiments are not limited in this context.

In one embodiment, system 100 may comprise an Automated Speech Recognition (ASR) system 108. ASR 108 may be used to detect voice information from a human user. The voice information may be used by an application system to provide application services. The application system may comprise, for example, a Voice Recognition (VR) system, an Interactive Voice Response (IVR) system, speakerphone systems and so forth. Cell phone systems may also use ASR 108 to switch signal transmission on and off depending on the presence of voice activity or the direction of speech flows. ASR 108 may also be used in microphones and digital recorders for dictation and transcription, in noise suppression systems, as well as in speech synthesizers, speech-enabled applications, and speech recognition products. ASR 108 may be used to save data storage space and transmission bandwidth by preventing the recording and transmission of undesirable signals or digital bit streams that do not contain voice activity. The embodiments are not limited in this context.

In one embodiment, ASR 108 may comprise a number of components. For example, ASR 108 may include Continuous Speech Processing (CSP) software to provide functionality such as high-performance echo cancellation, voice energy detection, barge-in, voice event signaling, pre-speech buffering, full-duplex operations, and so forth. ASR 108 may be further described with reference to FIG. 2.

In one embodiment, system 100 may comprise a network 104. Network 104 may comprise a packet-switched network, a circuit-switched network or a combination of both. In the latter case, network 104 may comprise the appropriate interfaces to convert information between packets and Pulse Code Modulation (PCM) signals as appropriate.

In one embodiment, network 104 may utilize one or more physical communications mediums as previously described. For example, the communications mediums may comprise RF spectrum for a wireless network, such as a cellular or mobile system. In this case, network 104 may further comprise the devices and interfaces to convert the packet signals carried from a wired communications medium to RF signals. Examples of such devices and interfaces may include omni-directional antennas and wireless RF transceivers. The embodiments are not limited in this context.

In general operation, system 100 may be used to communicate information between call terminals 102 and 106. A caller may use call terminal 102 to call XYZ company via call terminal 106. The call may be received by call terminal 106 and forwarded to ASR 108. Once the call connection is completed, ASR 108 may pass information from an application system to the human user. For example, the application system may audibly reproduce a welcome greeting for a telephone directory. ASR 108 may monitor the stream of information from call terminal 102 to determine whether the stream comprises any voice information. The user may respond with a name, such as "Steve Smith." When the user begins to respond with the name, ASR 108 may detect the voice information, and notify the application system that voice information is being received from the user. The application system may then respond accordingly, such as connecting call terminal 102 to the extension for Steve Smith, for example.

ASR 108 may perform a number of operations in response to the detection of voice information. For example, ASR 108 may be used to implement a "barge-in" function for the application system. Barge-in may refer to the case where the user begins speaking while the application system is providing the prompt. Once ASR 108 detects voice information in the stream of information, it may notify the application system to terminate the prompt, removes echo from the incoming voice information, and forwards the echo-canceled voice information to the application system. The voice information may include the incoming voice information both before and after ASR 108 detects the voice information. The former case may be accomplished using a buffer to store a certain amount of pre-threshold speech, and forwarding the buffered pre-threshold speech to the application system.

Figure 2:
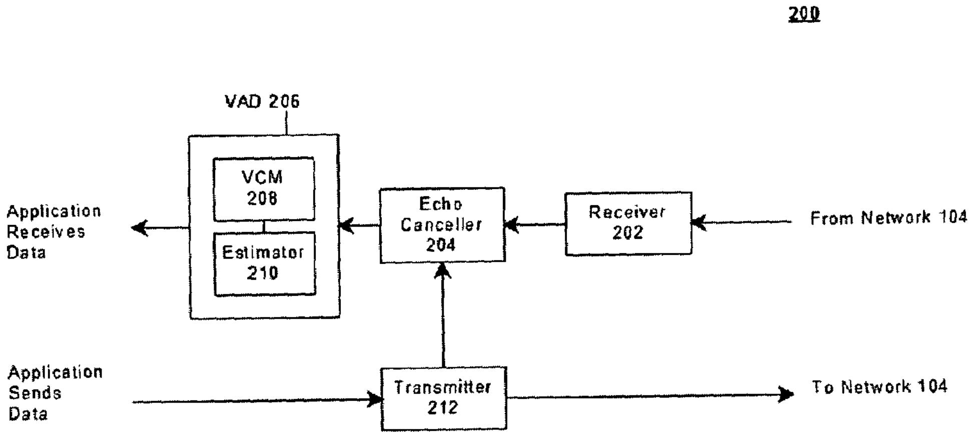
FIG. 2 illustrates a block diagram of a portion of an ASR system in accordance with one embodiment.

FIG. 2 may illustrate an ASR system in accordance with one embodiment. FIG. 2 may illustrate an ASR 200. ASR 200 may be representative of, for example, ASR 108. In one embodiment, ASR 200 may comprise one or more modules or components. For example, in one embodiment ASR 200 may comprise a receiver 202, an echo canceller 204, a Voice Activity Detector (VAD) 206, and a transmitter 212. VAD 206 may further comprise a Voice Classification Module (VCM) 208 and an estimator 210. Although the embodiment has been described in terms of "modules" to facilitate description, one or more circuits, components, registers, processors, software subroutines, or any combination thereof could be substituted for one, several, or all of the modules.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented using software executed by a processor. The processor may be a general-purpose or dedicated processor, such as a processor made by Intel® Corporation, for example. The software may comprise computer program code segments, programming logic, instructions or data. The software may be stored on a medium accessible by a machine, computer or other processing system. Examples of acceptable mediums may include computer-readable mediums such as read-only memory (ROM), random-access memory (RAM), Programmable ROM (PROM), Erasable PROM (EPROM), magnetic disk, optical disk, and so forth. In one embodiment, the medium may store programming instructions in a compressed and/or encrypted format, as well as instructions that may have to be compiled or installed by an installer before being executed by the processor. In another example, one embodiment may be implemented as dedicated hardware, such as an Application Specific Integrated Circuit (ASIC), Programmable Logic Device (PLD) or Digital Signal Processor (DSP) and accompanying hardware structures. In yet another example, one embodiment may be implemented by any combination of programmed general-purpose computer components and custom hardware components. The embodiments are not limited in this context.

In one embodiment, ASR 200 may comprise a receiver 202 and a transmitter 212. Receiver 202 and transmitter 212 may be used to receive and transmit information between a network and ASR 200, respectively. An example of a network may comprise network 104. If ASR 200 is implemented as part of a wireless network, receiver 202 and transmitter 212 may be configured with the appropriate hardware and software to communicate RF information, such as an omni-directional antenna, for example. Although receiver 202 and transmitter 212 are shown in FIG. 2 as separate components, it may be appreciated that they may both be combined into a transceiver and still fall within the scope of the embodiments.

In one embodiment, ASR 200 may comprise an echo canceller 204. Echo canceller 204 may be a component that is used to eliminate echoes in the incoming signal. In the previous example, the incoming signal may be the speech utterance "Steve Smith." Because of echo canceller 204, the "Steve Smith" signal has insignificant echo and can be processed more accurately by the speech recognition engine. The echo-canceled voice information may then be forwarded to the application system.

In one embodiment, echo canceller 204 may facilitate implementation of the barge-in functionality for ASR 200. Without echo cancellation, the incoming signal usually contains an echo of the outgoing prompt. Consequently, the application system must ignore all incoming speech until the prompt and its echo terminate. These types of applications typically have an announcement that says, "At the tone, please say the name of the person you wish to reach." With echo cancellation, however, the caller may interrupt the prompt, and the incoming speech signal can be passed to the application system. Accordingly, echo canceller 204 accepts as inputs the information from receiver 202 and the outgoing signals from transmitter 212. Echo canceller 204 may use the outgoing signals from transmitter 212 as a reference signal to cancel any echoes caused by the outgoing signal if the user begins speaking during the prompt.

In one embodiment, ASR 200 may comprise VAD 206. VAD 206 may monitor the incoming stream of information from receiver 202. VAD 206 examines the incoming stream of information on a frame by frame basis to determine the type of information contained within the frame. For example, VAD 206 may be configured to determine whether a frame contains voice information. Once VAD 206 detects voice information, it may perform various predetermined operations, such as send a VAD event message to the application system when speech is detected, stop play when speech is detected (e.g., barge-in) or allow play to continue, record/stream data to the host application only after energy is detected (e.g., voice-activated record/stream) or constantly record/stream, and so forth. The embodiments are not limited in this context.

In one embodiment, estimator 210 of VAD 206 may measure one or more characteristics of the information signal to form one or more frame values. For example, in one embodiment, estimator 210 may estimate energy levels of various samples taken from a frame of information. The energy levels may be measured using the root mean square voltage levels of the signal, for example. Estimator 210 may send the frames values for analysis by VCM 208.

There are numerous ways to estimate the presence of voice activity in a signal using measurements of the energy and/or other attributes of the signal. Energy level estimation, zero-crossing estimation, and echo canceling may be used to assist in estimating the presence of voice activity in a signal. Tone analysis by a tone detection mechanism may be used to assist in estimating the presence of voice activity by ruling out DTMF tones that create false VAD detections. Signal slope analysis, signal mean variance analysis, correlation coefficient analysis, pure spectral analysis, and other methods may also be used to estimate voice activity. Each VAD method has disadvantages for detecting voice activity depending on the application in which it is implemented and the signal being processed One problem with existing VAD techniques is that they typically begin with the assumption that frames with voice information ("voiced frames") have higher levels of energy, and frames with unvoiced information ("unvoiced frames") have lower levels of energy. There are a number of occasions, however, when a voiced frame may have lower levels of energy and unvoiced frames higher levels of energy. In these cases, the VAD may miss detecting voice information.

To solve these and other problems, VAD 206 may determine whether a frame contains voice information through the use of VCM 208. VCM 208 may implement a fuzzy logic algorithm to ascertain the type of information carried within a frame. The term "fuzzy logic algorithm" as used herein may refer to a type of logic that recognizes more than true and false values. With fuzzy logic, propositions can be represented with degrees of truthfulness and falsehood. For example, the statement "today is sunny" might be 100% true if there are no clouds, 80% true if there are a few clouds, 50% true if it is hazy and 0% true if it rains all day. VAD 206 my use the gradations provided by fuzzy logic to provide a more sensitive detection of voice information within a given frame. As a result, there is a greater likelihood that VAD 206 may detect voice information within a frame, thereby improving the performance of the application systems relying upon VAD 206.

In one embodiment, VCM 208 may comprise a component utilizing a fuzzy logic algorithm to analyze the frame of information and determine its class. The classes may comprise, for example, voice information, silence information, unvoiced information and transient information. For example, VCM 208 may receive the frame values from VAD 206. The frame values may represent, for example, energy level values. VCM 208 takes the energy level values as input and processes them using the fuzzy logic algorithm. VCM 208 uses one or more fuzzy logic rules to compare the energy level values with one or more threshold parameters. Based on this comparison, VCM 208 assigns one or more fuzzy logic values to the frame. The fuzzy logic values may be summed, and used to determine a class for the frame. The class determination may be performed by comparing the fuzzy logic values to one or more class indicator values, for example. The comparison results may indicate whether the frame comprises voice information, silence information, unvoiced information or transient information. VAD 206 may notify the application system in accordance with the results of the comparison.

Figure 3:
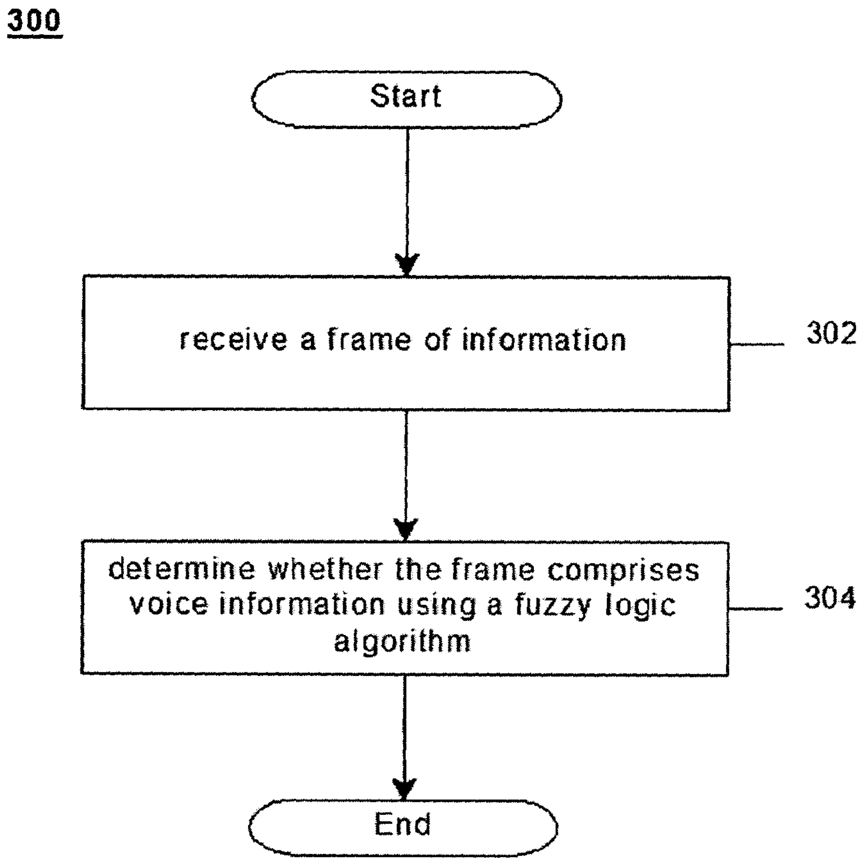
FIG. 3 illustrates a block flow diagram of the programming logic performed by a VAD in accordance with one embodiment.
Figure 4:
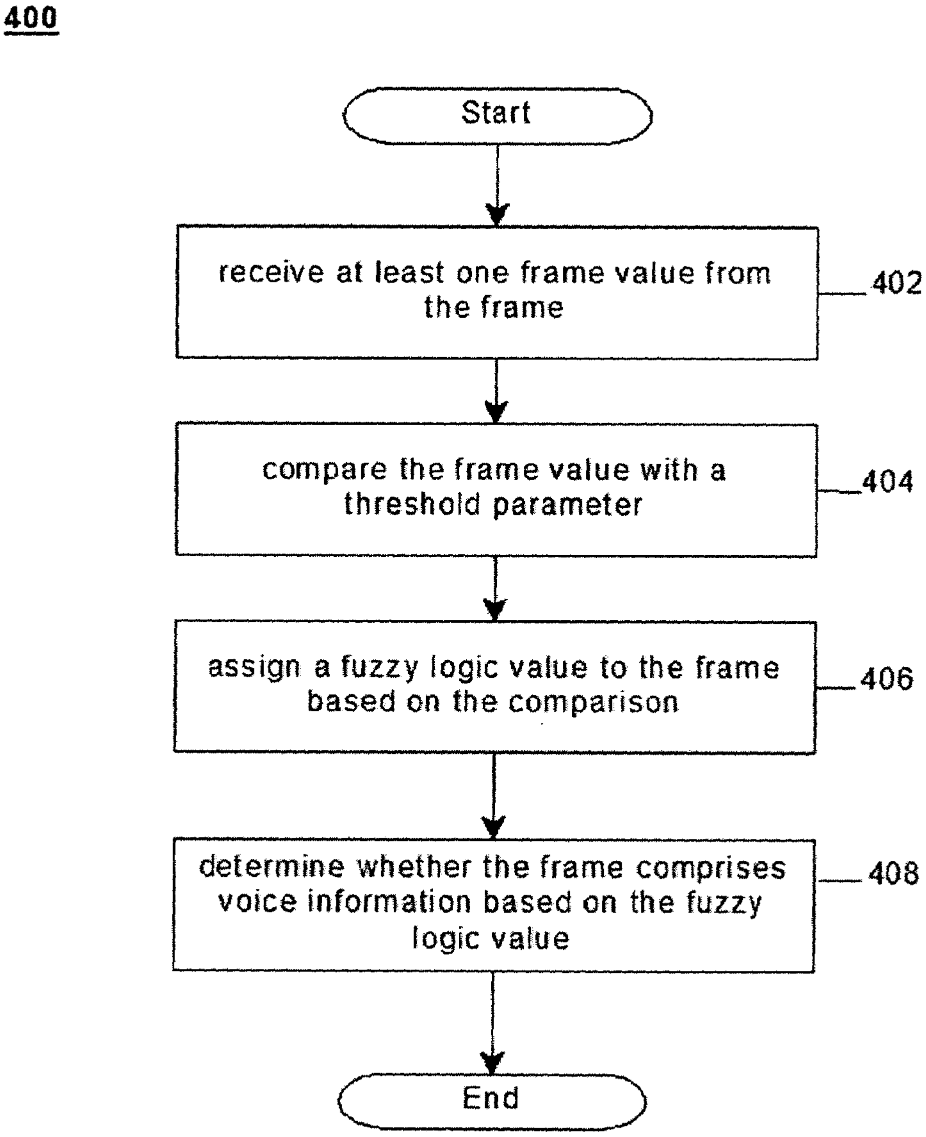
FIG. 4 illustrates a block flow diagram of the programming logic performed by a Voice Classification Module (VCM) in accordance with one embodiment.

The operations of systems 100 and 200 may be further described with reference to FIGS. 3-5 and accompanying examples. FIGS. 3-4 represent programming logic in accordance with one embodiment. Although FIGS. 3 and 4 as presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

FIG. 3 illustrates a programming logic 300 for a VAD in accordance with one embodiment. An example of the VAD may comprise VAD 206. Programming logic 300 may illustrate a programming logic to perform voice detection. For example, a frame of information may be received at block 302. A determination may be made as to whether the frame comprises voice information using a fuzzy logic algorithm at block 304.

In one embodiment, the determination at block 304 may include measuring at least one characteristic of said frame. The characteristic may be energy levels for various samples taken from the frame. One or more frame values may be generated based on the measurements.

FIG. 4 illustrates a programming logic 400 for a VCM. An example of a VCM may comprise VCM 208. Programming logic 400 may illustrate a programming logic to determine whether a frame comprises voice information. At least one frame value from the frame may be received at block 402. The frame value may be compare with a threshold parameter at block 404. The fuzzy logic value may be assigned to the frame based on the comparison at block 406. A determination may be made as to whether the frame comprises voice information based on the fuzzy logic value at block 408. The determination at block 408 may be made by comparing the fuzzy logic value to one or more class indicator values, for example.

In one embodiment, the frame of information may be received at block 302 by receiving the frame of information from receiver 202 at echo canceller 204. An echo cancellation reference signal may be received from transmitter 212. VAD 206 may use the echo cancellation reference signal to reduce or cancel echo caused by, for example, the outgoing prompt being transmitted from the application system. Echo canceller 204 may send the echo canceled frame of information to VAD 206 to begin the voice detection operation.

Once VAD 206 determines that a frame of information comprises voice information, it may notify one or more application systems. For example, VAD 206 may send a signal to a voice player to terminate the prompt. This may assist in implementing the barge-in functionality. VAD 206 may also send a signal a voice recorder to begin recording the voice information. VAD 206 may also send a signal to the buffer holding the pre-threshold speech to forward the buffered pre-threshold speech to the voice recorder. This may ensure that the entire speech utterance is captured thereby reducing clipping. The embodiments are not limited in this context.

The operation of systems 100 and 200, and the programming logic shown in FIGS. 3 and 4, may be better understood by way of example. Assume a caller uses call terminal 102 to call XYZ company via call terminal 106. The call may be received by call terminal 106 and forwarded to ASR 200. Once the call connection is completed, ASR 200 may pass information from an application system to the human user. The application system may be, for example, an IVR application system. The IVR application system may audibly reproduce a welcome greeting for an automated telephone directory, for example. ASR 200 may monitor the stream of information from call terminal 102 to determine whether the stream comprises any voice information. The user may respond with a name, such as “Steve Smith.” As the user responds with the name, call terminal 102 may encode the word “Steve Smith” in a stream of information. The stream of information may be sent in the form of packets to call terminal 106 via network 104. Call terminal 106 may forward the stream of packets to ASR 200.

Receiver 202 of ASR 200 may receive the stream of information. Receiver 202 may send the stream of information to echo canceller 204. Echo canceller 204 may also be receiving echo cancellation reference signals from transmitter 212. Once echo canceller 204 cancels any echoes from the received stream of information, it may forward the stream to VAD 206. VAD 206 monitors the stream on a frame by frame basis to detect voice information.

VAD 206 may receive a frame of information and begin the voice detection operation. Estimator 210 of VAD 206 may measure the energy levels of a plurality of samples. The amount and number of samples may vary according to a given implementation. In one embodiment, for example, the number of samples may be 4 samples per frame. The energy level values may be sent to VCM 208.

VCM 208 may implement a fuzzy logic algorithm to determine the type of information carried by the frame. In one embodiment, for example, the fuzzy logic algorithm may be implemented in accordance with the following pseudo-code:

```
/* Rule 1: Strong Voiced */
if ((energy112>=5 || (energy123>2 && energy134>4)) && energy114>8)
{
    sw1d = 6;
    uw1d = 1;
    tw1d = 4;
    vw1d = 14;
}
/* Rule 2: Strong Unvoiced */
if (energy134<2 || (energy123<2 && energy113<=4) || energy112<0)
{   if (energy114<10)
    {
        un34 = 13;
        sn34 = 5;
        tn34 = 6;
        vn34 = 1;
    }
    else if (energy114>=10)
    {
        sn34 = 4;
        un34 = 11;
        tn34 = 7;
        vn34 = 3;
    }
}
/* Rule 3: Strong Silence */
if (pwr__sum1 <=log__bck__noise+thpwr1)
{
    sp1 = 19;
    up1 = 3;
    tp1 = 3;
    vp1 = 0;
}
else if (pwr__sum1>log__bck__noise+thpwr1 &&
    pwr__sum2<log__bck__noise+thpwr2)
{
    sp1 = 9;
    up1 = 7;
    tp1 = 5;
    vp1 0 4;
}
else if (pwr__sum1>=log__bck__noise+thpwr3)
{
    if ((energy112>=5 || energy134>1) && energy114>10)
    {
        sp1 = 0;
        up1 = 3;
        tp1 = 6;
        vp1 = 16;
    }
    else
    {
        sp1 = 0;
        up1 = 15;
        tp1 = 4;
        vp1 = 6;
    }
}
```

A fuzzy logic algorithm may implement a plurality of rules. As shown above, the fuzzy logic algorithm as described herein implements three rules. The first rule provides an indication of a voiced frame. The second rule provides an indication of an unvoiced frame. The third rule provides an indication of a silence frame. As each rule is tested, fuzzy logic values are assigned to each of the four types or classes. In one embodiment, the four classes may comprise voice information, unvoiced information, silence information, and transient information. The fuzzy logic values are summed across rules for each class, and the class with the maximum score is determined as the most likely classification for the frame of information. If the most likely frame is voiced, further tests may be carried out to confirm the classification. For example, the frame may be tested to determine whether it satisfies hard bounds on spectral stationary.

As indicated in the pseudo-code, VCM 208 takes as input four energy samples from estimator 210. The energy level values are categorized into four bins, with each bin comprising a frequency range from 300 Hertz (Hz) to 3500 Hz. This range may represent the voice band. For example, the first bin energy112 may represent those energy samples between 0-700 Hz. The second bin energy123 may represent those energy samples between 700-1400 Hz. The third bin energy134 may represent those energy samples between 1400-2800 Hz. The fourth bin energy114 may represent those energy samples between 2800-3600 Hz. The energy value for each bin is compared to a threshold parameter for each rule. The threshold parameter may be determined by a heuristic analysis to establish minimum or floor boundaries for the energy levels. If the rule conditions are met, then each class may be assigned a fuzzy logic value as indicated. For example, if the conditions for the strong voice rule are met, then sw1d is assigned a fuzzy logic value of 6, and uw1d is assigned a fuzzy logic value of 1. The variables sw1d and uw1d may represent the strong voice class and unvoiced class, respectively. Since the energy levels are within the stated frequency ranges, the strong voice class is given a higher fuzzy logic score than the unvoiced class. Once the analysis is completed, the fuzzy logic values may be summed and used to determine a classification for the frame.

Figure 5:
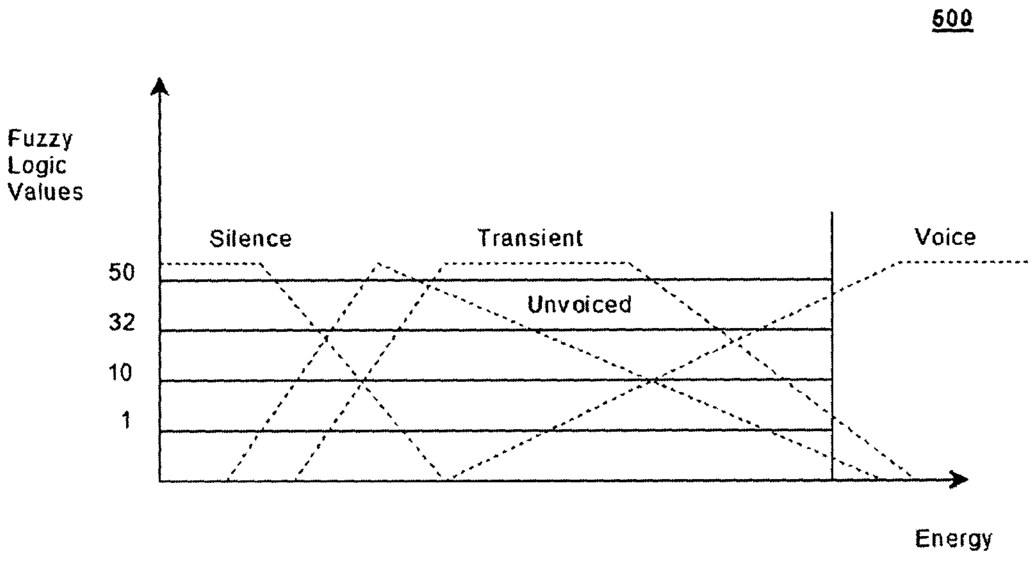
FIG. 5 illustrates a graph indicating classifications using fuzzy logic values in accordance with one embodiment.

FIG. 5 illustrates a graph for a fuzzy logic algorithm output in accordance with one embodiment. FIG. 5 illustrates a graph 500 to show how the summed fuzzy logic values may be used to classify the frame of information. The fuzzy logic values may be compared to one or more class indicator values to perform the classification. As shown in graph 500, for example, if there is low energy and the silence class has a combined fuzzy logic value of 25 or above, then the frame indicates the presence of silence information. The value of 25 may represent one class indicator value, for example. If there is high energy and the voice class has a score of 25 or above, then the frame indicates the presence of voice information. A combination of the fuzzy logic values and energy levels may indicate varying probabilities of voice information, unvoiced information, silence information and transient information, as shown in graph 500.

It may be appreciated that the values used for the pseudo-code and graph 500, such as the threshold parameters and class indicators, are by way of example. These values may vary according to a number of factors, such as the Signal to Noise Ratio (SNR) of the system, the Quality of Service (QoS) requirements of the system, error rate tolerances, type of protocols used, and so forth. The actual values may be derived using a heuristic analysis of the proposed system in view of these and other criteria.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform voice detection, comprising:
receiving a frame of information; receiving an echo cancellation reference signal;
canceling echo from said frame of information;
sending said frame of information to a voice activity detector; and
determining whether said frame comprises voice information using a fuzzy logic algorithm and by measuring at least one characteristic of said frame and generating at least one frame value based on said measurements.

2. The method of claim 1, wherein said frame value is an estimate of an energy level.

3. The method of claim 2, wherein said determining further comprises:
receiving at least one frame value;
comparing said frame value with a threshold parameter;
assigning a fuzzy logic value to said frame based on said comparison; and
determining whether said frame comprises voice information based on said fuzzy logic value.

4. The method of claim 3, wherein said determining whether said frame comprises voice information based on said fuzzy logic value comprises:
comparing said fuzzy logic value with a class indicator value; and
determining whether said frame comprises voice information in accordance with said comparison of said fuzzy logic value and said class indicator value.

5. The method of claim 1, further comprising:
determining that said frame comprises voice information; and
notifying an application system that said frame comprises voice information.

6. A system, comprising:
an antenna;
a receiver connected to said antenna to receive a frame of information;
an echo canceller connected to said receiver to cancel echo; and
a voice activity detector to detect voice information in said frame using a fuzzy logic algorithm and by measuring at least one characteristic of said frame and generating at least one frame value based on said measurements.

7. The system of claim 6, further comprising a transmitter to provide an echo cancellation reference signal to said echo canceller.

8. The system of claim 6, where said voice activity detector further comprises:
an estimator to estimate energy level values; and
a voice classification module connected to said estimator to classify information for said frame.

9. The system of claim 8, wherein said voice classification module assigns fuzzy logic values to said frame based on energy level values, and determines whether said frame comprises voice information using said fuzzy logic values.

10. A voice activity detector, comprising:
an estimator to estimate energy level values; an echo canceller connected to said estimator to cancel echo; and
a voice classification module connected to said estimator to classify information for a frame, measure at least one characteristic of said frame and generate at least one frame value based on said measurements.

11. The voice activity detector of claim 10, wherein said voice classification module assigns fuzzy logic values to said frame based on energy level values, and determines whether said frame comprises voice information using said fuzzy logic values.

12. The voice activity detector of claim 11, wherein said voice classification module compares said fuzzy logic values to class indicators, and determines whether said frame comprises voice information in accordance with said comparison.

13. An article comprising:

a computer readable storage medium;

said computer readable storage medium including stored instructions that, when executed by a processor, result in performing voice detection, by receiving a frame of information, receiving an echo cancellation reference signal, canceling echo from said frame of information, sending said frame of information to a voice activity detector; and determining whether said frame comprises voice information using a fuzzy logic algorithm and by measuring at least one characteristic of said frame and generating at least one frame value based on said measurements.

14. The article of claim 13, wherein the stored instructions, when executed by a processor, further results in generating said at least one frame value by estimating an energy level.

15. The article of claim 14, wherein the stored instructions, when executed by a processor, further results in said determining by receiving at least one frame value, comparing said frame value with a threshold parameter, assigning a fuzzy logic value to said frame based on said comparison, and determining whether said frame comprises voice information based on said fuzzy logic value.

16. The article of claim 15, wherein the stored instructions, when executed by a processor, further results in determining whether said frame comprises voice information based on said fuzzy logic value by comparing said fuzzy logic value with a class indicator value, and determining whether said frame comprises voice information in accordance with said comparison of said fuzzy logic value and said class indicator value.

17. The article of claim 13, wherein the stored instructions, when executed by a processor, further results in determining that said frame comprises voice information, and notifying an application system that said frame comprises voice information.

18. A method to perform voice detection, comprising:

receiving a frame of information; receiving an echo cancellation reference signal;

canceling echo from said frame of information;

sending said frame of information to a voice activity detector; and determining whether said frame comprises voice information using at least one frame value and comparing said frame value to a spectrum of values indicating degrees of truthfulness;

said determining further comprising measuring at least one characteristic of said frame and generating at least one frame value based on said measurements.

19. The method of claim 18, wherein said frame value is an estimate of an energy level.

* * * * *